(12) United States Patent
Zhang et al.

(10) Patent No.: US 7,022,751 B2
(45) Date of Patent: Apr. 4, 2006

(54) COMPOSITE PLASTIC MATERIALS PRODUCED FROM WASTE MATERIALS AND METHOD OF PRODUCING SAME

(75) Inventors: Chengjie Zhang, Aurora (CA); Bruno Casciato, Woodbridge (CA)

(73) Assignee: Royal Group Technologies Limited, Woodbridge (CA)

( * ) Notice: Subject to any disclaimer, the term of this patent is extended or adjusted under 35 U.S.C. 154(b) by 401 days.

(21) Appl. No.: 10/326,310

(22) Filed: Dec. 23, 2002

(65) Prior Publication Data

US 2003/0125399 A1    Jul. 3, 2003

(30) Foreign Application Priority Data

Jan. 2, 2002    (CA)    ................................. 2366430

(51) Int. Cl.
*C08K 9/08*    (2006.01)
*C08J 11/04*    (2006.01)

(52) U.S. Cl. .................. 523/206; 521/40; 521/41; 521/45.5; 521/48; 521/49; 524/35; 524/401; 524/494

(58) Field of Classification Search ................. 521/40, 521/48, 49, 41, 45.5; 523/206
See application file for complete search history.

(56) References Cited

U.S. PATENT DOCUMENTS

| | | | | |
|---|---|---|---|---|
| 2,433,727 A | * | 12/1947 | Arnold | ........................ 442/409 |
| 2,550,650 A | * | 4/1951 | Arnold | ........................ 525/184 |
| 3,600,269 A | * | 8/1971 | Daniels et al. | ............. 442/169 |
| 5,494,628 A | * | 2/1996 | Beyer et al. | ................. 264/125 |
| 5,707,474 A | * | 1/1998 | Andersen et al. | ........... 156/257 |
| 6,271,270 B1 | * | 8/2001 | Muzzy et al. | ................. 521/48 |
| 6,387,967 B1 | * | 5/2002 | Muzzy et al. | ................. 521/48 |
| 6,756,412 B1 | * | 6/2004 | Muzzy | ......................... 521/48 |

FOREIGN PATENT DOCUMENTS

JP    58127761 A    *    7/1983

* cited by examiner

*Primary Examiner*—Tae H. Yoon

(57) ABSTRACT

Fiber reinforced composite plastic materials for use in injection and compression molding and extrusion processing produced from waste materials, the composite material includes an effective amount of high melting point polymer fiber material and a sufficient amount of low melting point plastic material to coat and bind the high melting point fiber material together and method of producing same.

10 Claims, No Drawings

COMPOSITE PLASTIC MATERIALS PRODUCED FROM WASTE MATERIALS AND METHOD OF PRODUCING SAME

FIELD OF THE INVENTION

This invention relates to useful composite plastic materials produced from consumer, construction, commercial and industrial waste and, more particularly, to composite plastic materials adapted for injection and compression molding and extrusion processes produced from such waste material and their method of production.

BACKGROUND OF THE INVENTION

There is today a widespread effort to use recycled and waste materials to produce useful products with the object of both producing products at lower cost while making an environmental contribution by using waste materials which would otherwise be discarded into dumps or landfill waste areas.

Such efforts to process waste materials have had limited success, utilizing minimal amounts of selected waste material and have not led to large scale production of a wide range of low cost acceptable composite products.

In this connection, it has been a major problem with such prior art composite materials to use them to obtain products with consistent or uniform quality and desired structural characteristics or specifications or to modify them to control or vary their specifications for different applications.

Many of the prior art processes which combine waste or filler materials with a plastic binder are simply batch processes which discharge a batch mass of hot mixed materials and this hot mass or paste is delivered to a compression mold to be molded under heat and pressure.

Further, such prior art composite material processes usually require some form of chemical additive to effect an acceptable adherence of the mixed waste and plastic particles to provide a useful product.

For example, published European Patent Application EPO 401 885 A1 discloses a process which proposes mixing various solid waste materials particularly wood, thermoplastic and thermosetting synthetic materials, synthetic and natural rubber, synthetic and/or natural fibers, with polyethylene and various quantities of stabilizers, lubricants and chemical seamars or binders. This mixture is then heated into a plasticized mass and routed to a compression mold and molded under high pressure. The only examples given were limited to the use of wood and it was pointed out that without the chemical additives, i.e. the binders, stabilizers and lubricants, it was found that the products produced were unacceptable and would disintegrate.

Again, U.S. Pat. No. 4,033,866, issued Jan. $27^{th}$, 1977, discloses a construction material produced from a hot pasty mass which includes waste plastic along with at least one thermoplastic resin and particles of a filler component which have been previously treated by encapsulating them. with a polyethylene or polypropylene wax.

U.S. Pat. No. 5,075,057 discloses the use of scrap plastics which are ground and heated and then dry blended with preheated material selected from reinforcing materials and fillers with the final heated blend then compression molded at elevated temperatures and pressures into a product of predetermined shape. To provide the product with greater strength, the material added to the plastic blend is chemically surface treated prior to the blending.

Another batch process which takes the hot mass of recycled plastic and waste or filler particles from a high intensity mixer and feeds the batch of hot material into a compression mold is disclosed in U.S. Pat. No. 5,497,594. In this case, recycled plastic and waste or filler particles are subjected to particle interaction in the high intensity mixer with the heated mixture delivered to a compression mold for molding under heat and pressure into a shaped product.

U.S. Pat. No. 5,406,768 discloses a product formed from a polymer and wood fiber. In this case, the wood fiber is obtained, for example, from sawdust produced by sawing or milling wood at saw mills. These wood particles are then combined with a polymer, eg. polyvinyl chloride, at high temperatures and pressures and then extruded through an extrusion dye in a linear extrudiate that is cut off into pellets for subsequent use in extruding or injection molding various profiles or products. Such synthetic materials are relatively expensive as the polymer is virgin material and is preferably more than 50 percent of the total weight of the product and the product is limited to those manufactures where wood is desirable.

One of the difficulties of all of the prior art composite materials is the range of products for which they can be used is limited and/or the products produced lack consistent characteristics or quality.

It is the object of the present invention to overcome the limitations of the prior art and to process large volumes of landfill and industrial, commercial and institutional waste, (except organic materials such as food waste, dirty diapers etc., or toxic or chemical or hazardous waste hereinafter EXCEPTED WASTE) into composite plastic materials capable of being extruded, injection molded, or compression molded to consistently produce quality produce with the desired characteristics.

It is a further object to enable the compositions of the composite plastic materials to be accurately controlled and varied to provide the requisite characteristics in the products they are intended to produce.

It is a further object of the invention to be able to produce such materials utilizing essentially all streams of waste other than EXCEPTED WASTE.

In this connection, the invention makes use of streams of construction waste consisting mainly of bricks, slabs of concrete, broken wood skids and the like, broken glass, drywall material and some plastic wastes (also some metal items which are process discarded) by including them in composite materials designed to produce strong or tough products.

The invention also makes use of curb side waste left in blue boxes in many localities which include all plastic used in households on a daily basis, paper materials, some glass (also some metal items which are process discarded) by including them in composite materials as part of the plastic binding materials and fiber content.

The invention further utilizes the streams of industrial waste including rubber waste from belting and tires etc, thermoset plastics, waste diaper material produced in their manufacture, automobile waste such as plastic bumpers, automobile carpet and vehicle interior padding and waste commercial and residential carpets for inclusion in composite materials to produce molded or extruded products having great internal integrity.

The invention further utilizes streams of plastic products from retail stores comprising C.D. players and other products which are defective or failed warranty and are no longer for sale or resale. Such items usually are of about 90% plastic injection molded or extrusion grade materials and some metal which is discarded during processing. These high grade plastics are included in the composite materials as low melting point carriers for the composite materials.

All of such waste rather than being taken to landfill sites is received directly from the various sources by garbage trucks, rear packers, dump trucks, tractor trailers etc.

SUMMARY OF THE INVENTION

After lengthy and extensive experimentation with waste products as outline above, in trying to provide composite plastic materials which would produce products having the desired properties and could be consistently produced, it was finally discovered that it was possible to produce highly useful fiber reinforced plastic composite materials ready for extrusion, injection molding or compression molding by incorporating in the composite materials entangled lengths of high melting point polymeric or plastic fibers which are coated or encapsulated intact in carrier plastic materials having a melting point below the melting point of the plastic fibers.

It was also found that the utilization of such fibers which produce entangled fiber networks enabled the incorporation into the fiber reinforced plastic composite material of property modifying inorganic non-melting filler particles of wastes such as glass, concrete, brick and the like, provided that the particles were of a size small enough to flow through the molding and extrusion equipment without damaging same.

Similarly, the invention also involves the incorporation in the composite material of property modifying organic fillers, eg. thermoset plastics such as rubber and polyurethane foam, and organic reinforcing materials such as wood fiber as hereinafter set out.

DETAILED DESCRIPTION ACCORDING TO THE PREFERRED EMBODIMENTS OF THE PRESENT INVENTION

The waste materials from the various sources as outlined above are handled in the order in which they are received.

In the case of construction waste, the waste consists mainly of brick, slabs of concrete, wood members and structures, dry wall, minor amounts of plastics and other contaminants, as well as various metal items, ferrous and non-ferrous. This material is put through a line of down sizing equipment including one or more shredders, grinders, hammer mills and pulverizes. The non-melting materials, such as glass, concrete, brick, drywall, etc.are broken up with particles of a size, eg. $1/16^{th}$ inch or less, which will easily pass through all processing equipment such as extrusion equipment and injection molding equipment and can be uniformly distributed in melting plastics. During the downsizing, the various metal materials are discarded or removed along the way as they are difficult to reduce to the desired particle size without exceptionally powerful pulverizers.

In the case of blue box curb side waste which is made up of all plastics used in households on a daily basis along with some ferrous and non-metal ferrous contamination as well as paper and a small percentage of organic waste, the material is downsized to the order of particles of $3/16^{th}$ of an inch or less, the metal again being removed along the way.

Other garbage waste from households and industrial complexes (except the EXCEPTED WASTE) are likewise processed to reduce them to a particle size of $3/8^{th}$ of an inch or less.

In particular, the waste carpet and vehicle interior padding and waste commercial and residential carpets with or without backings, which is received in bales, includes high melting point polymeric fibers, eg. polyethylene terephthalate (PET) fibers and nylon fibers (Nylon) whose melting points are substantially above 200° C. and at least of the order of 240° C. Where the carpets have backings, the backings include such material as calcium carbonate fillers, low melting point fibrous polypropylene (PP), low density polyethylene (LDPE) and ethlyene vinyl acetate (EVA) having melting points below about 200° C. This material is shredded and ground into particles of about ½ inch.

As this carpet and padding material is a major source of high melting point fibers, the particles should not be reduced to much less than $3/16^{th}$ of an inch to ensure that they provide a network of lengths of entangled fibers in the finished composite material.

After shredding and grinding, this carpet material is densified in a California Pellet Mill (CPM) and formed into pellets of about $3/8^{th}$ inch or less consisting principally in the form of high melting point fiber networks, ready for binding with other materials selected to provide the desired composite material properties.

Again, the plastic articles returned to retail stores for discarding are shredded and ground into particles about $3/8^{th}$ inch or less with any metal being removed before final grinding. Such plastics comprise a commingling of common plastics such as polypropylene (PP), high density polyethylene (HDPE), low density polyethylene (LDPE), linear low density polyethylene (LLDPE), thermoplastic elastomer (TPE), thermoplastic olifin (TPO) and polystrene (PS), homopolymers, random copolymers and impact copolymers whose melting points would fall within the range of from about 125° C. to 200° C.

The downsized particles from the various sources are separately stored in storage silos ready to be transported into a California Pellet Mill via a weigh blending system and blended into a formulation to meet the finished product requirements.

Following the blending of the selected components, none of which are prime or virgin materials, they are then processed without any chemical additives by heating to a temperature below about 240° C. at which the common commingled plastics will be properly melted but below the melting point of the plastic fibers while the high melting point PET fibers and/or nylon fibers (at least one of which will be present) are encapsulated intact but somewhat softened and flexible and form fibrous or entangled networks in the common plastic. This heated material is then extruded through an extrusion die and cut into pellets of the order of $3/8^{th}$ of an inch. If it should be desired to increase the melt flow of the finished pellets for processing in the extruding and molding equipment, additional low melting point or high melt flow carrier plastics can be added in the final processing step.

The finalized pellets are ready to be used in injection or, compression molding or extrusion processes. Because of the low melting point of the carrier plastic of the composite product pellets, such molding and extrusion operations which involve the melting of the plastic content of the pellets are carried out at temperatures below the melting point of the contained high melting point fibers leaving these entangled fibers intact but somewhat softened and flexible. As a result during the molding and extrusion processes, the entangled unmelted fibers in the melted plastic and adapted to link together or interconnect to provide a high quality fiber reinforced finished product having high internal strength or integrity.

While, of course, the amounts of the various materials can vary in a wide range to meet the desired specifications of the end fiber reinforced composite material pellets designed for specific uses, the non-melting fibrous material preferably comprising at least about 5% by weight of the pellet and usually about 30% by weight, but may be as high as 80% by weight. In turn, the commingled plastic may vary from about 20% to 60% by weight, as illustrated the following examples:

EXAMPLE 1

| | |
|---|---|
| High Melting Point Plastic Fibers | 45% by weight |
| Sawdust | 10% by weight |
| Low Melting Point Plastics | 45% by weight. |

This composite material has a wide range of use such as molded frames and shed floors.

EXAMPLE 2

| | |
|---|---|
| High Melting Point Plastic Fiber | 40% by weight |
| Glass | 30% by weight |
| Low Melting Point Plastics | 30% by weight. |

This composite material is widely used in forming highway signs and bases for such signs where weight is important.

EXAMPLE 3

| | |
|---|---|
| High Melting Point Plastic Fiber | 20% by weight |
| Concrete | 30% by weight |
| Low Melting Point Plastics | 50% by weight. |

This composite material is used where the product is to have both toughness and some ductibility.

EXAMPLE 4

| | |
|---|---|
| High Melting Point Plastic Fiber | 40 to 80% by weight |
| Low Melting Point Plastic | 20 to 60% by weight. |

This composite material provides products with high impact strength such as vinyl sidings.

Another useful example using calcium carbonate filler is:

EXAMPLE 5

| | |
|---|---|
| Sawdust | 10% by weight |
| Calcium Carbonate | 30% by weight |
| Low Melting Point Plastic | 55% by weight. |

The above examples are illustrative only and it will be appreciated that there are many variations and permutations possible in the formulation of the composite materials with constituents selected from, for example, the construction inorganic fillers such as glass, concrete, brick and drywall etc., from the organic fillers, eg. thermoset plastics such as rubber and polyurethane foam, from organic reinforcement material such as wood fiber, and high melting point cotton, PET and Nylon fiber and from low melting plastics such as polypropylene, high density polyethylene, low density polyethylene, thermoplastic polyolifin, polystrene and linear low density polyethylene etc.

It is intended to cover all such formulations coming within the scope of the appended claims.

The embodiments of the invention in which an exclusive property or privilege is claimed are defined as follows:

1. A fiber reinforced composite plastic material for use in injection and compression molding and extrusion processing produced from waste materials, said composite material comprising pellets incorporating an effective amount of high melting point waste polymer fiber material comprising polyethylene terephthalate and/or nylon coated and bound together by fused waste plastic material having a melting point substantially below the melting point of said fiber material, said pellets further incorporating particles of an inorganic filler of a size to pass through injection molding and extrusion equipment without damaging same coated and bound together by said waste plastic material, said inorganic filler particles comprising particles of waste construction material selected from one or more of the group consisting of glass, brick; concrete, drywall, and wood, said pellets further including particles of an organic filler coated and bound together by said waste plastic material.

2. A fiber reinforced composite plastic material for use in injection and compression molding and extrusion processing produced from waste materials, said composite material comprising pellets incorporating an effective amount of high melting point waste polymer fiber material coated and bound together by fused waste plastic material having a melting point substantially below the melting point of said fiber material, said high melting point fiber material in said pellets comprising a network of lengths of fiber having a melting point substantially above 200° C. bound together by said fused fiber coating plastic material with said fused fiber coating plastic material having a melting point in the range of about 125° C. to 200° C., said composite material pellets further include coated and bound sawdust particles with said high melting point fiber material comprising about 45% by weight of said composite material in said pellets, said sawdust particles comprising about 10% by weight of said composite material in said pellets and said fiber coating plastic material comprising about 45% by weight of said composite material in said pellets.

3. A composite plastic material as claimed in claim 1 in which said organic filler particles are particles of a thermoset plastic.

4. A composite plastic material as claimed in claim 3 in which said thermoset plastic particles are selected from one or more of the group of thermoset plastic particles consisting of rubber and polyurethane foam.

5. A composite plastic material as claimed in claim 1 in which said fused waste plastic material comprises one or more of the following low melting point plastics, polypropylene, a homopolymer, a random copolymer an impact copolymer, high density polyethylene, low density polyethylene, linear low density polyethylene, thermoplastic olefin, thermoplastic elastomer, polystrene and polyvinyl chloride.

6. A composite plastic material as claimed in claim 5 in which said fiber coating plastic material is a commingled plastic including at least two of said low melting point plastics.

7. A method of producing from waste material a fiber reinforced composite material for use in injection and compression molding and extrusion processes, said method comprising receiving separately streams of waste material from construction sites, from households, from retail stores disposing of unsaleable plastic products and from industrial sites, downsizing the waste material in each stream into small particles and storing suck particles from each stream separately in silos ready for blending, said silos providing sources of the following types of materials comprising:

- Group 1. Inorganic filler particles comprising particles of one or more of glass, concrete, brick, drywall and wood;
- Group 2. Organic filler particles of thermoset plastics including one or more of rubber and polyurethane foam;
- Group 3. Organic reinforcement fibers comprising one or more of polyethylene terephthalate (PET) fibers and Nylon fibers which have high melting points substantially above 2000° C.; and
- Group 4. Common low melting point plastics comprising one or more of high density polyethylene, liner low density polyethylene, low density polyethylene, thermoplastic polyolefin, thermoplastic elastomer, and polystrene which have a melting point in the range of about 125° C. to 200° C.;

formulating a composite material by intimately mixing materials selected from said groups of materials, said formulation including at least about 20% by weight of high melting point plastic fibers selected from Group 3 and at least about 20% by weight of said low melting point plastic selected from Group 4; and processing said formulation by heating same to a temperature to melt said low melting point plastic material while leaving said fiber material in fibrous form and passing said heated material through an extrusion die as an extrudite stream and cutting said stream into composite material pellets ready for processing in injection molding and extrusion equipment.

8. A method as claimed in claim 7 in which said processing of said formulation is carried out at a temperature of about 160° C. to 200° C.

9. A method as claimed in claim 7 or 8 in which said formulation includes 30% by weight of glass.

10. A method as claimed in claim 7 or 8 in which said formulation includes 30% by weight of concrete.

* * * * *